(12) United States Patent
Kole et al.

(10) Patent No.: US 9,223,708 B2
(45) Date of Patent: Dec. 29, 2015

(54) SYSTEM, METHOD, AND COMPUTER PROGRAM PRODUCT FOR UTILIZING A DATA POINTER TABLE PRE-FETCHER

(71) Applicant: NVIDIA Corporation, Santa Clara, CA (US)

(72) Inventors: PrasannaKumar Shripal Kole, Bangalore (IN); Chung-Hong Lai, New Taipei (TW); Rahul Jain, Meerut (IN)

(73) Assignee: NVIDIA Corporation, Santa Clara, CA (US)

( * ) Notice: Subject to any disclaimer, the term of this patent is extended or adjusted under 35 U.S.C. 154(b) by 222 days.

(21) Appl. No.: 14/082,030

(22) Filed: Nov. 15, 2013

(65) Prior Publication Data

US 2015/0143058 A1    May 21, 2015

(51) Int. Cl.
*G06F 12/00*    (2006.01)
*G06F 12/08*    (2006.01)

(52) U.S. Cl.
CPC ........ *G06F 12/0862* (2013.01); *G06F 12/0888* (2013.01); *G06F 2212/304* (2013.01); *G06F 2212/602* (2013.01)

(58) Field of Classification Search
CPC .............. G06F 12/023; G06F 12/0862; G06F 12/0888; G06F 2212/602; G06F 2212/6022; G06F 2212/6024; G06F 2212/6026; G06F 2212/6028
See application file for complete search history.

(56) References Cited

U.S. PATENT DOCUMENTS

2008/0244169 A1* 10/2008 Dawson et al. ................ 711/108

\* cited by examiner

*Primary Examiner* — Shawn X Gu
(74) *Attorney, Agent, or Firm* — Zilka-Kotab, PC

(57) ABSTRACT

A system, method, and computer program product are provided for utilizing a data pointer table pre-fetcher. In use, an assembly of a data pointer table within a main memory is identified. Additionally, the data pointer table is pre-fetched from the main memory. Further, data is sampled from the pre-fetched data pointer table. Further still, the sampled data is stored within a data pointer table cache.

20 Claims, 12 Drawing Sheets

| DP Index in DPT | Data Buffer Size | Absolute Data Offset | comment |
|---|---|---|---|
| 0 | 1000 | 0 | |
| 1 | 2000 | 1000 | |
| 2 | 2000 | 3000 | stored in DPT cache |
| 3 | 99 | 5000 | |
| 4 | 68 | 5099 | |
| 5 | 123 | 5167 | |
| 6 | 44 | 5290 | stored in DPT cache |
| 7 | 55 | 5334 | |
| 8 | 10000 | 5389 | |
| 9 | 4096 | 15389 | |
| 10 | 2047 | 19485 | stored in DPT cache |
| 11 | 4096 | 21532 | |
| 12 | 512 | 25628 | |
| 13 | 111 | 26140 | |
| 14 | 912 | 26251 | stored in DPT cache |
| 15 | 712 | 27163 | |
| 16 | 4096 | 27875 | |
| 17 | 518 | 31971 | |
| 18 | 612 | 32489 | stored in DPT cache |
| 19 | 24 | 33101 | |
| 20 | 611 | 33125 | |
| 21 | 712 | 33736 | |
| 22 | 813 | 34448 | stored in DPT cache |
| 23 | 1111 | 35261 | |
| 24 | 6789 | 36372 | |
| 25 | 212 | 43161 | |
| 26 | 111 | 43373 | stored in DPT cache |
| 27 | 313 | 43484 | |
| 28 | 212 | 43797 | |
| 29 | 101 | 44009 | |
| 30 | 901 | 44110 | stored in DPT cache |
| 31 | 783 | 45011 | |

FIGURE 4

| CAM Offset | absolute data offset (ADO) | DP Index | |
|---|---|---|---|
| 0 | 3000 | 2 | ~602A |
| 1 | 5290 | 6 | ~602B |
| 2 | 19485 | 10 | ~602C |
| 3 | 26251 | 14 | ~602D |
| 4 | 32489 | 18 | ~602E |
| 5 | 34448 | 22 | ~602F |
| 6 | 43373 | 26 | ~602G |
| 7 | 44110 | 30 | ~602H |

FIGURE 6

| Cache Memory Offset | Cache Memory Contents |
|---:|---:|
| 0 | DP at Index 2 |
| 1 | DP at Index 6 |
| 2 | DP at Index 10 |
| 3 | DP at Index 14 |
| 4 | DP at Index 18 |
| 5 | DP at Index 22 |
| 6 | DP at Index 26 |
| 7 | DP at Index 30 |

FIGURE 8

SYSTEM, METHOD, AND COMPUTER PROGRAM PRODUCT FOR UTILIZING A DATA POINTER TABLE PRE-FETCHER

FIELD OF THE INVENTION

The present invention relates to data storage in memory, and more particularly to accessing data stored in memory.

BACKGROUND

Traditionally, data is often stored in memory in distributed/scattered/segmented form to be transferred to or from a device. For example, the device may view memory as a contiguous address space and may request a specific data pointer in the memory where data is to be sent or received. However, current techniques for identifying data pointers in memory have been associated with various limitations.

For example, current methodologies for identifying data pointers in memory may take a relatively long time to proceed and may therefore result in power and performance losses within a system. There is thus a need for addressing these and/or other issues associated with the prior art.

SUMMARY

A system, method, and computer program product are provided for utilizing a data pointer table pre-fetcher. In use, an assembly of a data pointer table within a main memory is identified. Additionally, the data pointer table is pre-fetched from the main memory. Further, data is sampled from the pre-fetched data pointer table. Further still, the sampled data is stored within a data pointer table cache.

BRIEF DESCRIPTION OF THE DRAWINGS

FIG. 4 shows an exemplary sampling of a data pointer table, in accordance with another embodiment.

FIG. 6 shows an exemplary data pointer table CAM that receives data from selected entries of a data pointer table, in accordance with another embodiment.

FIG. 8 illustrates a DPT cache populated by sampling a data pointer table, in accordance with another embodiment.

DETAILED DESCRIPTION

Figure 1:
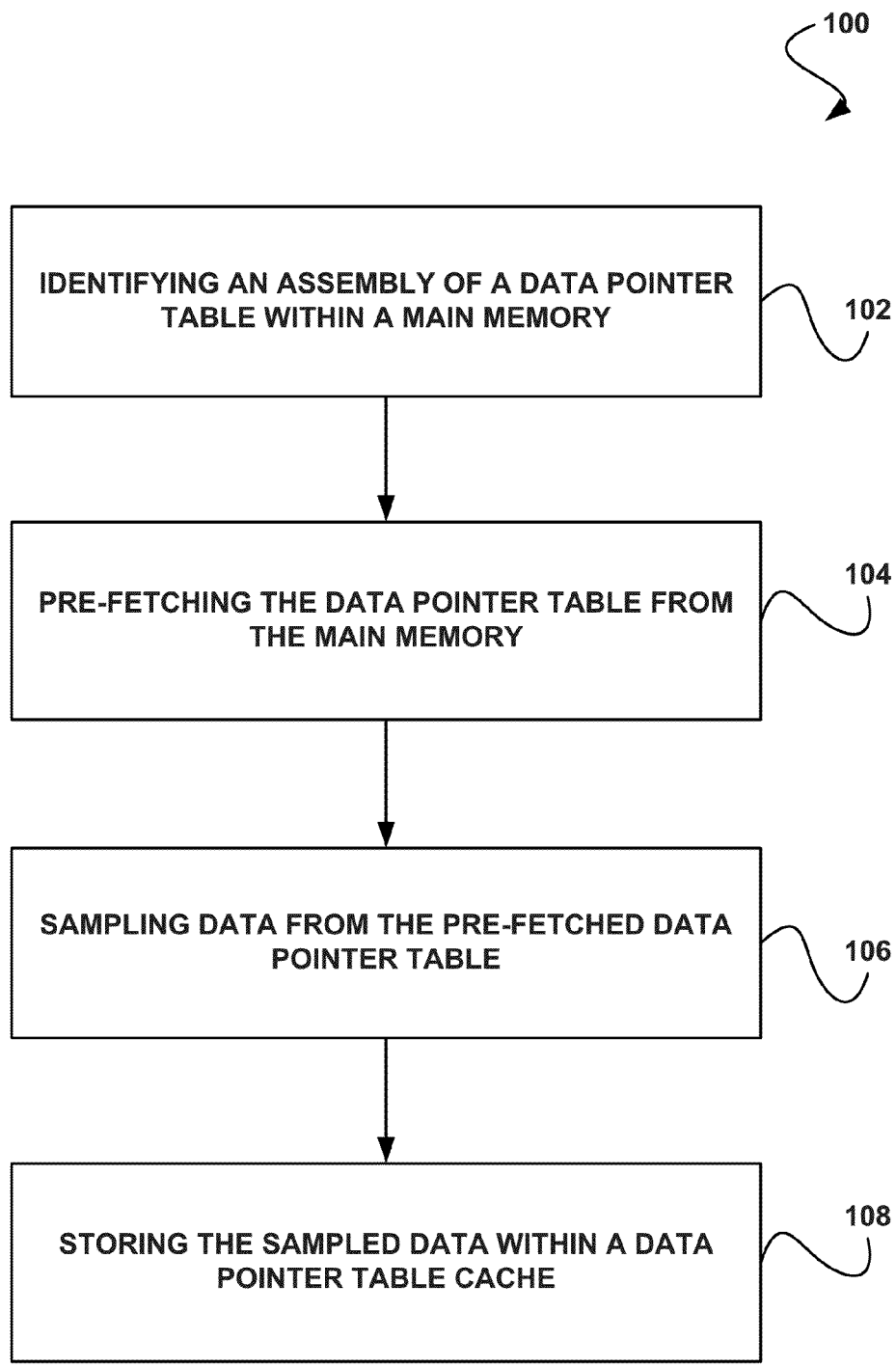
FIG. 1 shows a method for utilizing a data pointer table pre-fetcher, in accordance with one embodiment.

FIG. 1 shows a method 100 for utilizing a data pointer table pre-fetcher, in accordance with one embodiment. As shown in operation 102, an assembly of a data pointer table within a main memory is identified. In one embodiment, the main memory may include a memory space in which data is stored. In another embodiment, the memory space may be located within a system on a chip (SOC). In yet another embodiment, the memory space may include memory accessible by an SOC. In still another embodiment, the memory space may include memory space located on a hard drive, flash memory, on-chip memory, etc.

Additionally, in one embodiment, the assembly of the data pointer table (DPT) within the main memory may include the creation of the data pointer table within the main memory. In another embodiment, the data pointer table may be assembled within the main memory to address the storage of data in distributed form within the main memory. For example, data may be stored in the main memory in distributed form, where such data is to be transferred to a device or received from a device (e.g., a central processing unit (CPU), etc.). Further, the device requesting or transmitting the data may view the main memory as having a contiguous address space. As a result, the device may create the data pointer table within the main memory in order to assist in the retrieval or storage of data within the main memory.

Further, in one embodiment, the data pointer table may include a table having a plurality of entries. For example, the device may assemble the data pointer table by populating the data pointer table with each of the plurality of entries. In another embodiment, each of the entries within the data pointer table may include a data pointer that points to a particular location in main memory where a predetermined instance of data can be found.

Further still, in one embodiment, each of the entries within the data pointer table may include a start address in the main memory and an indication of a size of the instance of data pointed to by that entry (e.g., a data buffer size, an available size, etc.). Also, in one embodiment, the assembly of the data pointer table within the main memory may be identified by a pre-fetcher. For example, the pre-fetcher may be an algorithm implemented in hardware. In another embodiment, the pre-fetcher may be notified that the data pointer table has been assembled for assisting in data transfers between the main memory and the device. In yet another embodiment, the pre-fetcher may be notified by the device, one or more elements associated with the device, etc.

In addition, as shown in operation 104, the data pointer table is pre-fetched from the main memory. In one embodiment, the pre-fetcher may perform the pre-fetching of the data pointer table from the main memory. In another embodiment, the entire data pointer table may be pre-fetched by the pre-fetcher. In yet another embodiment, pre-fetching the data pointer table may include retrieving the data pointer table from the main memory (e.g., retrieving data that comprises the data pointer table from the main memory, etc.).

Furthermore, as shown in operation 106, data is sampled from the pre-fetched data pointer table. In one embodiment, the pre-fetcher may perform the sampling of the data from the pre-fetched data pointer table. In another embodiment, sampling the data from the pre-fetched data pointer table may include retrieving data from the data pointer table, extracting data from the data pointer table, etc. For example, sampling the data from the pre-fetched data pointer table may include retrieving one or more predetermined entries from the pre-fetched data pointer table.

Further still, in one embodiment, the data may be sampled from the pre-fetched data pointer table according to a pre-defined starting point. For example, the first entry within the pre-fetched data pointer table to be sampled may be determined utilizing one or more algorithms, according to one or more criteria, etc. In another embodiment, the data may be sampled from the pre-fetched data pointer table according to a predefined interval. For example, after the first entry in the pre-fetched data pointer table is sampled, a second entry may be determined at a predetermined interval from the first entry. In another example, the interval may be determined utilizing one or more algorithms, according to one or more criteria, etc.

Also, as shown in operation 108, the sampled data is stored within a data pointer table cache. In one embodiment, an absolute data offset may be calculated by the pre-fetcher. For example, an absolute data offset associated with each entry in the data pointer cache may be calculated by the pre-fetcher (e.g., by determining a total offset by adding all previous data buffer sizes from earlier entries within the data pointer table, etc.). In another embodiment, the calculated absolute data offset may be stored in a data pointer table content-addressable memory.

In another embodiment, the pre-fetcher may create one or more of the data pointer table cache and the data pointer table content-addressable memory (CAM). In another embodiment, storing the sampled data within the data pointer table cache may include creating an entry in the data pointer table cache for each entry sampled from the data pointer table. In yet another embodiment, an entry may be created in the data pointer table CAM for each entry sampled from the data pointer table.

Additionally, in one embodiment, for each sampled entry, the data pointer and data pointer index from the data pointer table for that sampled entry may be stored in a corresponding entry in the data pointer table CAM. In another embodiment, each entry in the data pointer table CAM may include a cache memory offset field (e.g., an integer index value that indicates the location of each entry within the data pointer table cache, etc.).

Further, in one embodiment, storing the sampled data within the data pointer table CAM may include, for each sampled entry, storing the absolute data offset and data pointer index for that sampled entry from the data pointer table in a corresponding entry in the data pointer table CAM. In another embodiment, each entry in the data pointer table CAM may include a CAM offset field (e.g., an integer index value that indicates the location of each entry within the data pointer table CAM, etc.). In yet another embodiment, the absolute data offset may be calculated by the pre-fetcher (e.g., during the sampling, etc.).

In this way, the total number of entries for the data pointer table cache, as well as the total number of entries for the data pointer table CAM, may include the total number of entries sampled from the data pointer table.

Further still, in one embodiment, the data pointer table cache and the data pointer table CAM may be used to respond to requests from the device. For example, a request from the device may be received. For instance, the request may be received by the pre-fetcher. In another example, the request may include a data offset and a data size. In another embodiment, one or more of the data offset and the data size may be compared against data in entries of the data pointer table CAM and the data pointer table cache. For example, the data pointer table CAM may be searched first, and based on the results of that search, the data pointer table cache may then be searched.

Also, in one embodiment, results may be obtained from the comparison of one or more of the data offset and the data size against data in entries of the data pointer table CAM and the data pointer table cache. For example, the comparison may result in one or more of a full hit (e.g., a 100% hit where the data offset in the request matches an absolute data offset entry in the data pointer table CAM and the data pointer cache, etc.), a partial hit (e.g., where the data offset in the request is within a predetermined distance from an absolute data offset entry in the data pointer table CAM and the data pointer cache, etc.), and a miss (e.g., where the data offset in the request is not within a predetermined distance from an absolute data offset entry in the data pointer table CAM and the data pointer cache, etc.).

Additionally, in one embodiment, data may be returned to the requesting device, based on the results of the comparison. For example, a matching data pointer and data buffer size may be returned to the device if a full hit results from the comparison. In another example, an adjusted data pointer and an adjusted data buffer size may be returned to the device if a partial hit results from the comparison. In yet another example, a data pointer index and a nearest matching absolute data offset may be returned to the device if a miss results from the comparison.

In this way, the development and use of the data pointer table cache and the data pointer table CAM may enable fast lookups of device pointers within a data pointer table.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
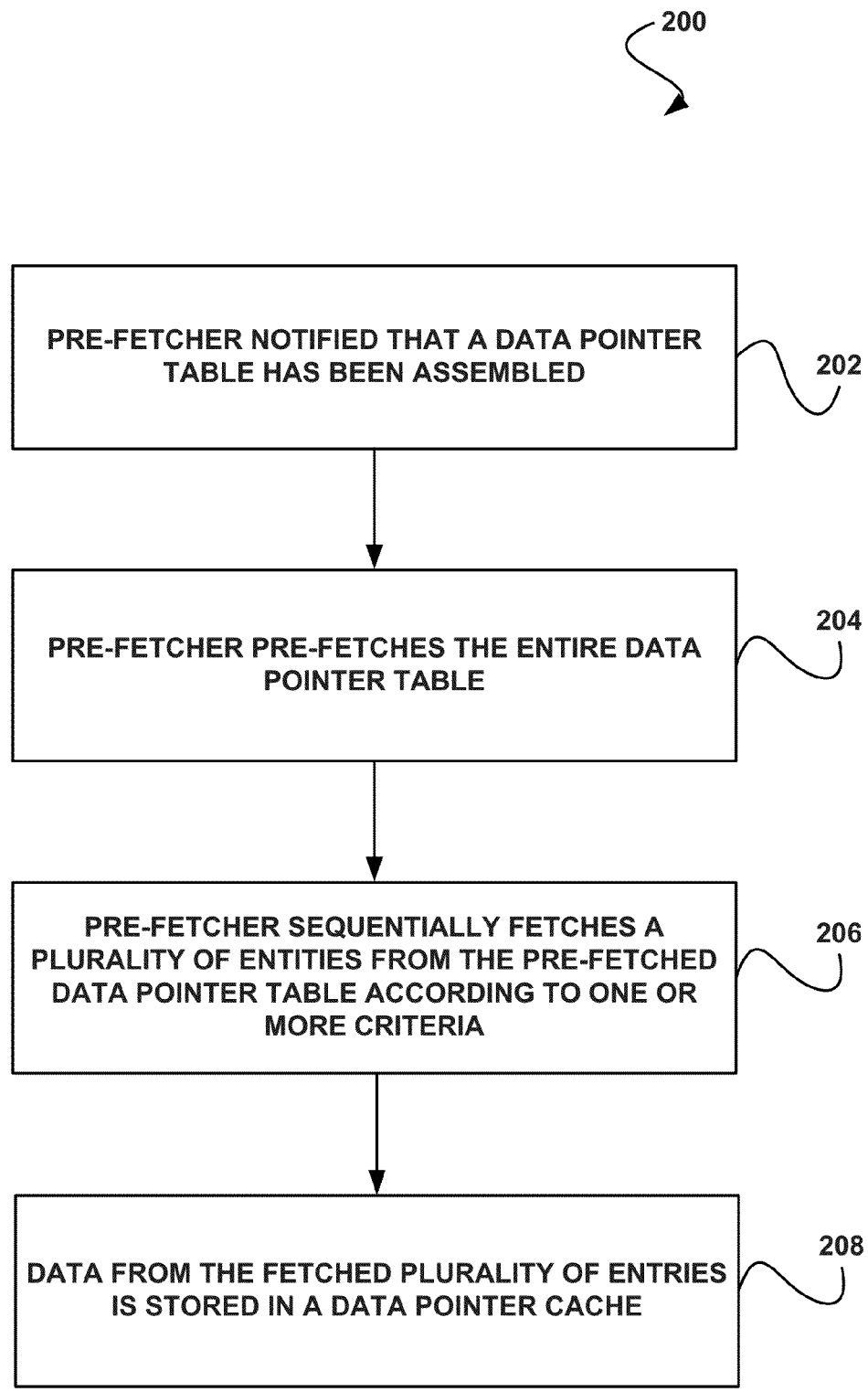
FIG. 2 shows a method for creating a data pointer table cache and data pointer table CAM, in accordance with another embodiment.

FIG. 2 shows a method 200 for creating a data pointer table cache and data pointer table CAM, in accordance with another embodiment. As an option, the method 200 may be carried out in the context of the functionality of FIG. 1. Of course, however, the method 200 may be implemented in any desired environment. It should also be noted that the aforementioned definitions may apply during the present description.

As shown in operation 202, a pre-fetcher is notified that a data pointer table has been assembled. In one embodiment, the data pointer table may be assembled to assist in the data transfer between a main memory and a device. In another embodiment, the device (e.g., a requestor such as a central processing unit (CPU)) may create the data pointer table within the main memory and may populate the data pointer table with a plurality of entries, where each entry contains a data pointer. In yet another embodiment, the device may notify the pre-fetcher that the data pointer table has been assembled.

Additionally, as shown in operation 204, the pre-fetcher pre-fetches the entire data pointer table. In one embodiment, pre-fetching the entire data pointer table may include retrieving data representing the entire data pointer table from the main memory. In another embodiment, the pre-fetcher may store the pre-fetched data pointer table in a memory other than the main memory, where the pre-fetcher is in communication with the other memory.

Further, as shown in operation 206, the pre-fetcher sequentially fetches a plurality of entries from the pre-fetched data pointer table according to one or more criteria. In one embodiment, fetching the entries may include retrieving data representing the plurality of entries from the pre-fetched data pointer table.

Further still, in one embodiment, the one or more criteria may include a predetermined starting point (e.g., a starting point within the pre-fetched data pointer table, a first entry to be fetched from the pre-fetched data pointer table, etc.). For example, the first entry to be fetched from the pre-fetched data pointer table may be determined by identifying a size of a data pointer table cache that will receive the fetched entries. For example, if the data pointer table cache has a capacity for N entries, then the predetermined starting point may be determined by dividing the entire length of the data pointer table by two times N (e.g., 2*N).

Also, in one embodiment, the first entry to be fetched from the pre-fetched data pointer table may be variable. For example, the first entry to be fetched from the pre-fetched data pointer table may be determined based on a predetermined traffic pattern. In another embodiment, the one or more criteria may include a predetermined interval (e.g., a stride, an interval between fetched entries within the pre-fetched data pointer table, etc.). For example, if the data pointer table cache has a capacity for N entries, then the interval between sampled points may be determined by dividing the entire length of the data pointer table by N.

Additionally, in one embodiment, the interval may be variable. For example, the interval may be determined based on a predetermined traffic pattern. In another example, the interval may be changed on the fly. In another embodiment, the criteria may include a specific attribute of the entries within the pre-fetched data pointer table. For example, entries may be retrieved based on a total length of a data buffer described by entries in the pre-fetched data pointer table. In another example, entries may be retrieved based on a logical block addressing (LBA)/sector number (e.g., an entry may be retrieved when the LBA associated with that entry is a multiple of a predetermined number, etc.). In this way, the fetched entries may not be equidistant from each other with respect to their placement within the pre-fetched data pointer table.

Further, as shown in operation 208, data from the fetched plurality of entries is stored in a data pointer table cache. For example, for each of the fetched plurality of entries, an indicator of an index location for that entry (e.g., an index number for that entry within the pre-fetched data pointer table, etc.) may be stored within an entry of the data pointer table cache. In another example, each entry of the data pointer table cache may be assigned a cache memory offset (e.g., an index number for each entry within the data pointer table cache, etc.).

Further still, in one embodiment, a data pointer table CAM may be created and populated with entries corresponding to each of the entries in the data pointer table cache. In another embodiment, each entry of the data pointer table CAM may be assigned a CAM offset (e.g., an index number for each entry within the data pointer table CAM, etc.). In another embodiment, the CAM offset within the data pointer table CAM may correspond to the cache memory offset in the data pointer table cache. In another embodiment, for each of the fetched plurality of entries, an indicator of an absolute data offset for that entry (e.g., an absolute data offset for that entry within the pre-fetched data pointer table, etc.) as well as a data pointer index and a cache offset may be stored within an entry of the data pointer table CAM.

Figure 3:
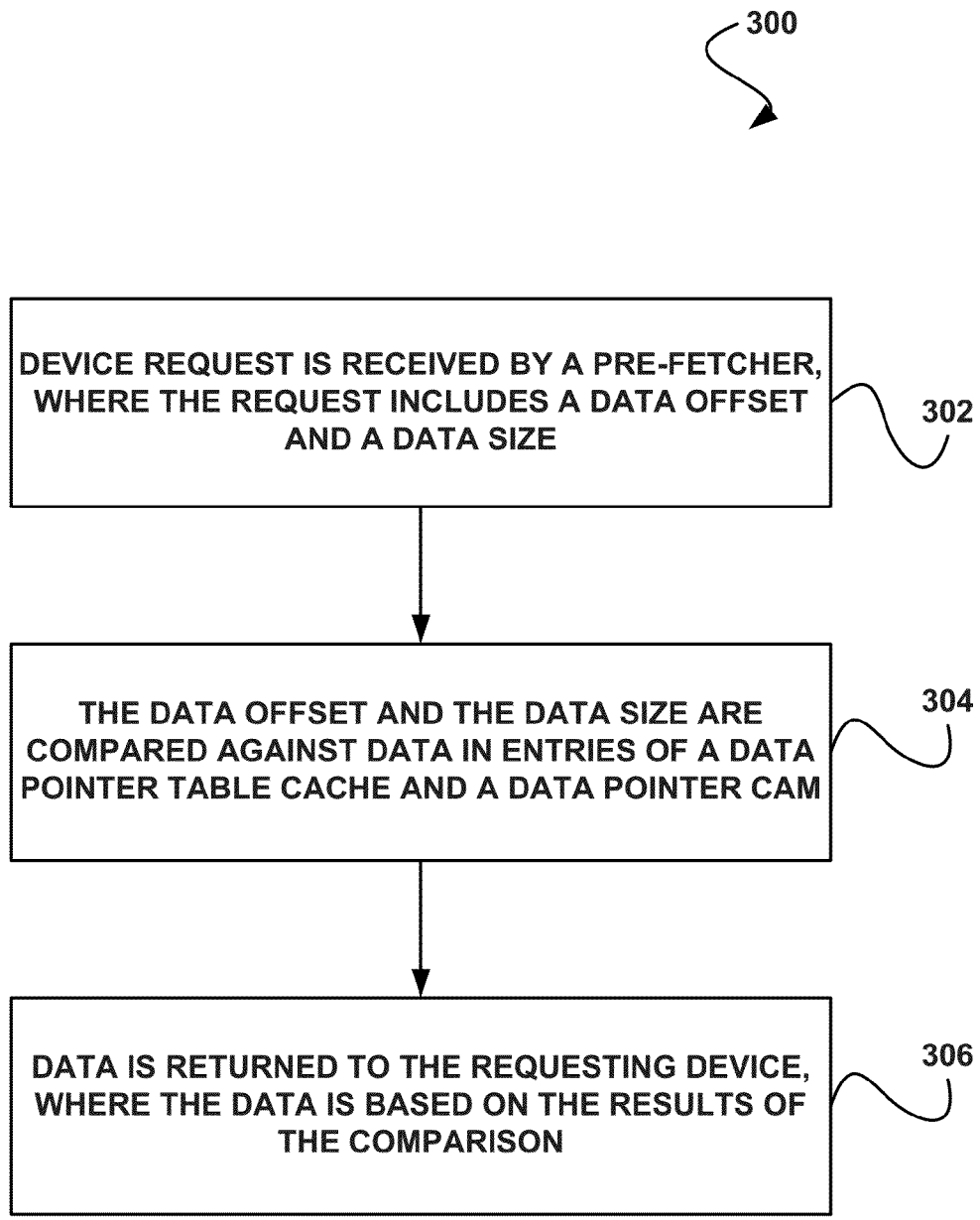
FIG. 3 shows a method for responding to a device request, utilizing a data pointer table cache and data pointer table CAM, in accordance with another embodiment.

FIG. 3 shows a method 300 for responding to a device request, utilizing a data pointer table cache and data pointer table CAM, in accordance with another embodiment. As an option, the method 300 may be carried out in the context of the functionality of FIGS. 1-2. Of course, however, the method 300 may be implemented in any desired environment. It should also be noted that the aforementioned definitions may apply during the present description.

As shown in operation 302, a device request is received by a pre-fetcher, where the request includes a data offset and a data size. Additionally, as shown in operation 304, the data offset and the data size are compared against data in entries of a data pointer table cache and a data pointer table CAM. For example, it may be determined whether the comparison results in a 100% hit, a partial hit, or a miss. Further, as shown in operation 306, data is returned to the requesting device, where the data is based on the results of the comparison.

For example, the data offset of the device request may be compared against all absolute data offset fields of the data pointer table CAM. In one embodiment, it may be determined that the data offset of the device request matches a specific absolute data offset field within the data pointer table CAM. This result may constitute a 100% hit for the comparison. In response to a 100% hit, the CAM offset of the matching entry may be identified, and an entry of the data pointer table cache having a cache memory offset that corresponds to such CAM offset may be identified. Additionally, the indicator of the index location within the corresponding entry of the data pointer table cache may be identified, and the data pointer index is located within a data pointer table, utilizing the indicator of the index location. Further, the data buffer size may be determined from the located data pointer index (e.g., as a field of the index, etc.), and the data pointer (e.g., a pointer to a location of the data in main memory, etc.) is determined from the located data pointer index. Further still, the determined data buffer size and data pointer may be returned to the device that sent the request.

Additionally, in one embodiment, it may be determined that the data offset of the device request does not exactly match a specific absolute data offset field within the data pointer table CAM. It may then be determined whether the data offset difference (e.g., the difference between data offset of the device request and the closest absolute data offset stored within the data pointer table CAM, etc.) is within a predetermined range. For example, the predetermined range may include one less than a data buffer size of an entry in the data pointer table having an absolute data offset matching the closest specific absolute data offset stored within the data pointer table CAM.

Further, in one embodiment, if the data offset difference is within (e.g., less than or equal to, etc.) the predetermined range, then the result may constitute a partial hit for the comparison. In response to a partial hit, the CAM offset of an entry having an absolute data offset closest to the data offset of the request may be identified, and an entry of the data pointer table cache having a cache memory offset that corresponds to such CAM offset may be identified. Additionally, the indicator of the index location within the corresponding entry of the data pointer table cache may be identified, and the data pointer index may be located within a data pointer table, utilizing the indicator of the index location. Further, the data buffer size may be determined from the located data pointer index (e.g., as a field of the index, etc.), and the data pointer (e.g., a pointer to a location of the data in main memory, etc.) may be determined from the located data pointer index.

Further still, the determined data buffer size and data pointer may be adjusted. For example, the data pointer may be readjusted by adding to the date pointer the value of the difference between the data offset of the device request and the nearest absolute data offset field within the data pointer table CAM. IN another example, the determined data buffer size may be adjusted by subtracting from the determined data buffer size the value of the difference between the data offset of the device request and the nearest absolute data offset field within the data pointer table CAM. Also, the adjusted determined data buffer size and data pointer may be returned to the device that sent the request, along with the associated data pointer index within the data pointer table.

Also, in one embodiment, if the data offset difference is greater than the predetermined range, then the result may constitute a miss for the comparison. In response to a miss, the CAM offset of an entry having an absolute data offset closest to the data offset of the request may be identified, and an entry of the data pointer table cache having a cache memory offset that corresponds to such CAM offset may be identified. Additionally, the indicator of the index location within the corresponding entry of the data pointer table cache may be identified, and the data pointer index may be located within a data pointer table, utilizing the indicator of the index location. Further, the data pointer index and the absolute data offset closest to the data offset of the request may be returned to the device that sent the request. In this way, the requestor may save work by not starting a search of the data pointer table at the very first index of the data pointer table.

FIG. 4 shows an exemplary sampling of a data pointer table 400, in accordance with another embodiment. As an option, the data pointer table 400 may be carried out in the context of the functionality of FIGS. 1-3. Of course, however, the data pointer table 400 may be implemented in any desired environment. It should also be noted that the aforementioned definitions may apply during the present description.

As shown, the data pointer table 400 includes a data pointer index column 402, a data buffer size column 404, and an absolute data offset column 406. It should be noted that each row within the data pointer table 400 may constitute an entry of the data pointer table 400. Additionally, each entry within the data pointer table 400 may also include a data pointer column entry that indicates the location of the data associated with each entry within main memory.

Additionally, selected entries 408A-H are sampled within the data pointer table 400. In one embodiment, the first sampling point 408A may be calculated by dividing the entire DPTL (data pointer table length, or length of the data pointer table 400) by 2N, where N is the number of allocated entries in a data pointer table (DPT) cache. This may result in a total number of DPTL/N data pointers per storage location in a DPT cache. The sampling point is picked in the middle of DPTL/N data points, hence the first sampling point 408A is DPTL/2N. After that the next sampling point 408B is calculated by adding DPTL/N to previous sampling point. For example, the data pointer table 400 is an exemplary table where N=8 and DPTL=32 DP entries.

Figure 5:
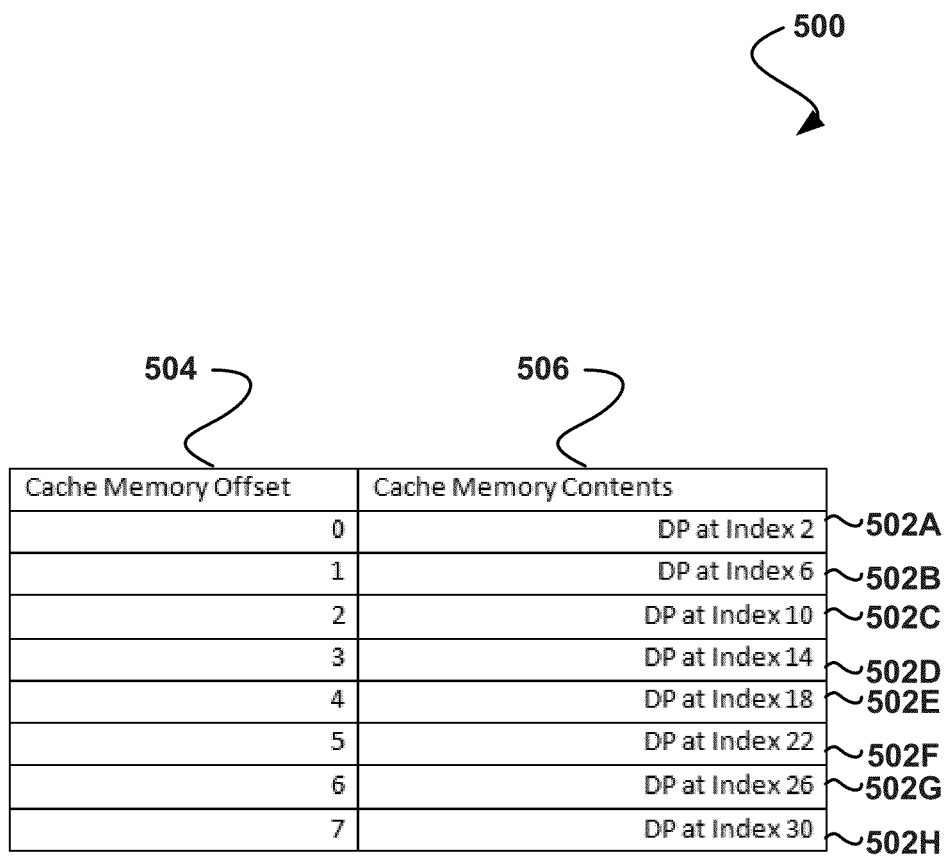
FIG. 5 shows an exemplary data pointer table cache that receives data from selected entries of a data pointer table, in accordance with another embodiment.

FIG. 5 shows an exemplary data pointer table cache 500 that receives data from selected entries of the data pointer table 400 of FIG. 4, in accordance with another embodiment. As an option, the data pointer table cache 500 may be carried out in the context of the functionality of FIGS. 1-4. Of course, however, the data pointer cache 500 may be implemented in any desired environment. It should also be noted that the aforementioned definitions may apply during the present description.

As shown, the data pointer table cache 500 includes a plurality of entries 502A-H, where each entry includes a cache memory offset 504 and cache memory contents 506. In one embodiment, data from the selected entries 408A-H may be inserted into the data pointer table cache 500 to create the plurality of entries 502A-H. For example, each entry 502A-H includes a cache memory contents 506 field that corresponds to the data pointer index column 402 field of each selected entry from the data pointer table 400 of FIG. 4. Additionally, each entry 502A-H includes a cache memory offset 504 field that uniquely identifies each entry in the DPT cache 500.

FIG. 6 shows an exemplary data pointer table CAM 600 that receives data from selected entries of the data pointer table 400 of FIG. 4, in accordance with another embodiment.

As an option, the data pointer table CAM 600 may be carried out in the context of the functionality of FIGS. 1-5. Of course, however, the data pointer CAM 600 may be implemented in any desired environment. It should also be noted that the aforementioned definitions may apply during the present description.

As shown, the data pointer table CAM 600 includes a plurality of entries 602A-H, where each entry includes a CAM offset 604, an absolute data offset (ADO) 606, and a data point (DP) index 608. In one embodiment, data from the selected entries 408A-H may be inserted into the data pointer table CAM 600 to create the plurality of entries 602A-H. For example, each entry 602A-H includes a DP index 608 field that corresponds to the data pointer index column 402 field of each selected entry from the data pointer table 400 of FIG. 4. Additionally, each entry 602A-H includes a CAM offset 604 field that uniquely identifies each entry in the DPT CAM 600. Further, each entry 602A-H includes an absolute data offset 606 field that corresponds to the absolute data offset 406 field of each selected entry from the data pointer table 400 of FIG. 4.

Further, in one embodiment, assuming space is available for N DPs per slot allocated in DPT Cache, N DPs are stored in the data pointer table cache 500 and corresponding N indexes are stored in the data pointer table CAM 600. Also, for a given index M, the Data buffer Size of all DPs before this index M (index 0 to M−1) are added and also stored in DPT CAM (called ADO 606).

Further still, in one embodiment, a pre-fetcher (e.g., a DPT pre-fetcher, etc.) may sequentially fetch DPs from the data pointer table 400 starting at the $0^{th}$ DP, and may store DPs at different DPT indexes (e.g., an index may include the pointer value pointing to DPs in the DPT 400, where the first DP in DPT starts at zero) along with an index value of the DP (which may be stored in DPT CAM 600), while discarding all the DPs between them (after adding up the data buffer size from them and storing it in the DPT CAM 600). This may allow either a DPT cache 500 hit, or in case of a miss, a lot less DPs to fetch by the requestor (e.g., the maximum being the gap between successive DPs stored in DPT cache 500, etc.).

Also, in one embodiment, each entry in the DPT 400 may be called a DP and may consist of a pointer to a data buffer in main memory (e.g., scattered data memory, etc.) as well as a size of the data buffer in main memory. In another embodiment, whenever a requestor (e.g, a device, etc.) populates DPT table 400 in main memory, it may indicate to the DPT pre-fetcher to start assembling the DPT Cache 500. In yet another embodiment, the DPT cache 500 for a given slot may be DE allocated whenever the requestor indicates completion of transaction for that slot.

Additionally, in one embodiment, whenever a data offset is provided by device for DPT lookup (e.g., in a request sent to the DPT 400, etc.), if the data offset of the request matches one of ADO (absolute data offset 606) on DPT CAM 600 it may be called a 100 percent hit, or if the data offset falls anywhere between the nearest matching ADO (which may be less than the data offset) plus the data buffer size of DP-1 which is located at the same CAM offset 604 in DPT cache 500 it may be considered as a partial hit. All other cases may be considered a miss.

Further, in one embodiment and using the above figures, if the data offset received from a device is 32490, then the nearest matching ADO 606 value is 32489. The CAM offset 604 value is 4. So in the DPT Cache 500 at offset 4, the DP Index 506 value is 18. So in the DPT table 400 at an index 402 value of 18 the data buffer size 404 value is 612. So 32490 falls in between (32489) and (32489+612−1). Assuming the data pointer for DP at the index is X, then the data pointer may be readjusted to X+(32490−32489) and the data buffer size may be re adjusted to 612−(32490−32489) by the DPT pre-fetcher and may be provided to the requestor. Also, the index 402 value of 18 may also be provided to the requestor so that in case of an additional required DP fetch due to consecutive data falling outside a partial hit range, the requestor can start at the DP index 402 value of 19 rather than 0.

Further still, in one embodiment and using the above figures, if the data offset received from the device is 32489, then the nearest matching ADO 606 value is 32489. The corresponding CAM offset 604 value is 4. So in the DPT cache 500 at offset 504 value 4, the DP index 506 value is 18. So in the DPT table 400 at the index 402 value 18, the data buffer size 404 value is 612. Assuming the data pointer for DP at the index is X, the data pointer is provided to the requestor as X and the data buffer size is provided to the requestor as 612. In another embodiment, such information may be provided by the DPT pre-fetcher.

Also, in one embodiment and using the above figures, in case of a miss, the DPT index (assume it as Y) at the CAM location 604 having the nearest matching ADO is picked, one is added to this index, and this index along with the ADO value 606 is provided to requestor. This helps requestor to start fetching the DPs from DPT index Y to get a 100 percent hit for itself (since the miss is provides by DPT pre-fetcher), which may save all work to fetch DPs from 0 to Y−1.

For example, if the data offset received from the device is 33101, then the nearest matching ADO 606 value is 32489. The CAM offset 604 value is 4. So in the DPT cache 500 at offset 4 the DP index 506 value is 18. So in the DPT table 400 at index 402 value 18 the Data buffer size is 612. So 33101 doesn't fall in between (32489) and (32489+612−1) and is therefore a miss. So index 18 and the nearest matching ADO 606 value (e.g., 32489) is provided to requestor, so that requestor can start at DP index 402 value 19 rather than 0 saving all fetches from index 0 to 18.

Table 1 illustrates an exemplary method for calculating which DP index is to be sampled, in accordance with one embodiment. Of course, it should be noted that the method shown in Table 1 is set forth for illustrative purposes only, and thus should not be construed as limiting in any manner.

TABLE 1

1. For DPTL equal to or less than N every DP is stored in DPT Cache/CAM
2. For DPTL greater than N following Calculation is used to calculate DP Index to be sampled for Storage in DPT Cache/CAM
    A. First Sampling DP Index = ROUND(DP_TABLE_LENGTH/(N*2))
    B. Second Sampling DP Index = ROUND(UN Rounded First Sampling DP Index + DP_TABLE_LENGTH/N)
    C. Third Sampling DP Index = ROUND(UN Rounded First Sampling DP Index + 2*DP_TABLE_LENGTH/N)
    D. nth Sampling DP Index = ROUND(UN Rounded First Sampling DP Index + n*DP_TABLE_LENGTH/N)

In one embodiment, the above calculation may be performed once per slot, whenever a new DPTL is populated by a requestor. For simplification the algorithm below is explained for a single slot, but the same methodology applies to all other slots, since N may be the same for all slots.

Table 2 illustrates an exemplary sampling DP index for different DPT lengths, in accordance with one embodiment. Of course, it should be noted that the index shown in Table 2 is set forth for illustrative purposes only, and thus should not be construed as limiting in any manner.

TABLE 2

| DP Table Length | DP Sampling Index |
| --- | --- |
| 4 | 0, 1, 2, 3 |
| 5 | 1, 2, 3, 4 |
| 6 | 1, 2, 4, 5 |
| 9 | 1, 3, 6, 8 |
| 12 | 2, 5, 8, 11 |
| 16 | 2, 6, 10, 14 |
| 20 | 3, 8, 13, 18 |

Since the number of DPT cache locations allocated for DPs per slot is an order of 2, the division portion of a sampling DP index can be calculated by pushing the DP Table Length value to the right appropriately.

Table 3 illustrates a method for rounding in calculating a sampling offset, in accordance with one embodiment. Of course, it should be noted that the method shown in Table 3 is set forth for illustrative purposes only, and thus should not be construed as limiting in any manner.

TABLE 3

If the DP_TABLE_LENGTH = 8'b11001111 = 207
N = 8
First sampling offset is calculated as
DP_TABLE_LENGTH/(N*2) = 2'b11001111 >> 4 = 4'b1100 and remainder 4'b1111
ROUND (DP_TABLE_LENGTH/(N*2)) = ROUND( 4'b1100 and remainder 4'b1111)
    = 4'b1100 + ROUND(4'b1111)
    = 4'b1100 + MSB(4'b1111)
    = 4'b1101 = 13

As shown above, for rounding, the numbers of bits shifted out in DP_TABLE_LENGTH may be taken and if the most significant bit (MSB) of this is 1 then one is added to Sampling DP Offset, otherwise 0 is added.

Additionally, in one embodiment, one or more architecture enhancements may be implemented to improve the DPT hit rate. For example, when sampling entries from a DPT, both the first sampling point as well as stride can be variable. In another embodiment, the first sampling point can be different depending on one or more traffic patterns. In another example, the stride between consecutive sample points can be different for different sampling points.

Further, in one embodiment, one or more of the sampling points can be adaptively changed on the fly based on one or more traffic patterns. For example, when a hit is received for a given sampling point, which points to offset M in a DPT cache, then that location in the DPT cache for the hit sampling point M may be flushed from the DPT cache and the next sampling point of M+1 (offset in DPTL) or a previous sampling point of M−1 (offset in DPTL) may be used to sample the DPTL into the flushed location of the DPT cache, which may provide an improved chance of a DPT cache hit.

Further still, in one embodiment, for an M+1 sampling point, a DPT CAM may need to be readjusted for an absolute data offset and a DPT index. So the new DPT index may be M+1, and the new absolute data offset may be the previous absolute data offset plus the data buffer size of the DPT CAM. The DPT cache may also store the DP at index M+1.

Also, in one embodiment, for an M−1 sampling point, the DPT CAM may need to be readjusted for an absolute data offset and a DPT index. So the new DPT index may be M−1, and the new absolute data offset may be the previous absolute data offset minus the data buffer size of the DPT CAM−1. Also, the DPT Cache may store the DP at index M−1.

In addition, in one embodiment, the entries stored in a local DPT cache may follow a different pattern/algorithm then being equidistant in terms of number of entries in the original DPT table. For example, entries to be stored may be chosen based on a total length of data buffer described by entries in the DPT or some other application specific attributes (e.g., in the case of storage media it may be LBA/Sector number (if LBA is multiple of number "n" then store it), etc.).

Furthermore, in one embodiment, there may be additional information stored in local DPT cache entries that may allow direct computation of an address for any intervening entry in system memory. For example, the additional attribute may be that all entries in original DPT have equal data buffer lengths, or the additional attribute may be the offset of a midpoint entry between two entries stored in the local cache.

Further still, in one embodiment, it may be assumed that the local DPT cache is populated once and then a given entry may be accessed multiple times, or it may be expanded for systems which analyze which entries have been consumed/accessed, and the entries in the DPT cache may be replaced with entries in the next location to improve to a 100% hit rate.

Figure 7:
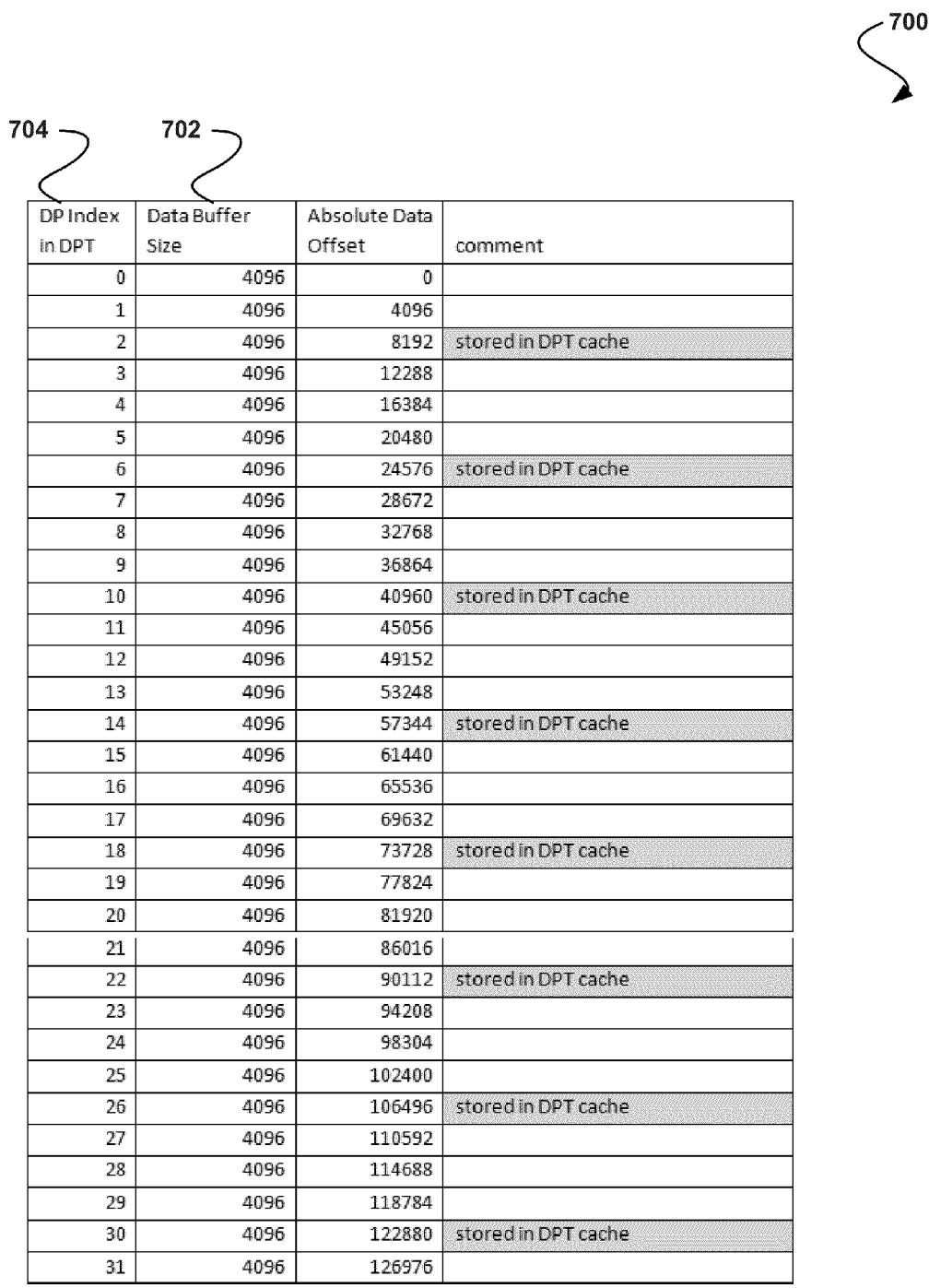
FIG. 7 shows an exemplary sampling of a data pointer table, in accordance with another embodiment.

FIG. 7 shows an exemplary sampling of a data pointer table 700, in accordance with another embodiment. As an option, the data pointer table 700 may be carried out in the context of the functionality of FIGS. 1-6. Of course, however, the data pointer table 700 may be implemented in any desired environment. It should also be noted that the aforementioned definitions may apply during the present description.

Figure 9:
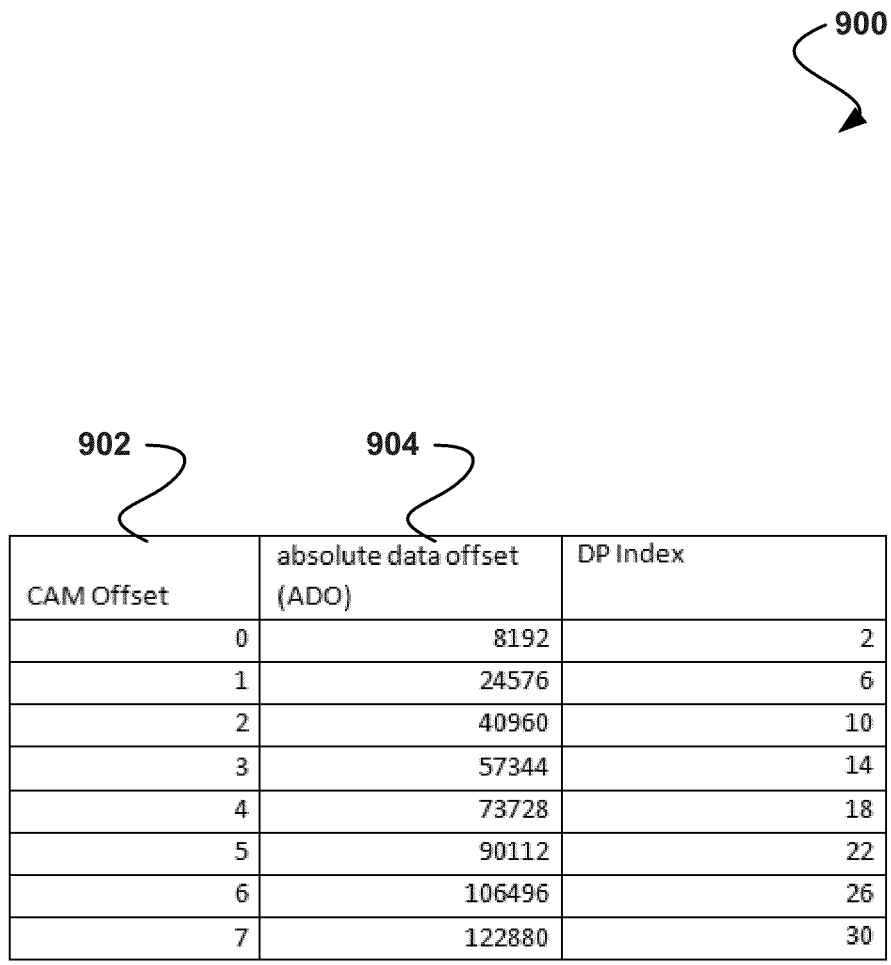
FIG. 9 illustrates a DPT CAM populated by sampling a data pointer table, in accordance with another embodiment.

As shown, the data buffer size 702 field entries are all the same. FIG. 8 illustrates a DPT cache 800 populated by sampling the data pointer table 700, and FIG. 9 illustrates a DPT CAM 900 populated by sampling the data pointer table 700.

In one embodiment, if a received data offset from a device is 50000, then the nearest matching ADO 904 index value is 40960. The CAM offset 902 index value for the entry is 2. So in the DPT cache 800 at offset index 802 value 2, the DP index 804 value is 10. So in the DPT 700 at index 704 value 10, the data buffer size 702 value is 4096. So 4096 doesn't fall between (40960) and (40960+4096−1) and therefore the request results in a miss. So the index 704 value 18 and the nearest matching ADO 904 value (77824) is provided to the requestor, so that requestor can start at the DP index 704 value 19 rather than 0, saving all fetches from index 0 to 18. But since it is known that the data buffer size 702 values of every DP are 4096, the index 704 value of the DP may be provided to the requestor which may provide a 100% hit to requestor.

Table 4 illustrates a method for determining a 100% hit within a DPT, in accordance with one embodiment. Of course, it should be noted that the method shown in Table 4 is set forth for illustrative purposes only, and thus should not be construed as limiting in any manner.

TABLE 4

Find the index Z of DP such that following equation holds true
    40960 + Z*4096 <= 50000
    40960 + (Z + 1)*4096 >= 50000
  Then the DP at index Z is the one which contains address needed by requestor for Data offset 50000.
    In above case Z = 2. So index for 100% hit is index for 40960 + Z, which is 18 + 2 = 20.

In this way, a 100% hit DPT cache hit percentage may be obtained by making use of the above data characteristics. For example, a 100% hit may be calculated by the above method for a repeated size of 4096 bytes, so that a requestor may not have to do this computation. This method can itself do the computation and provide a 100% hit.

Figure 10:
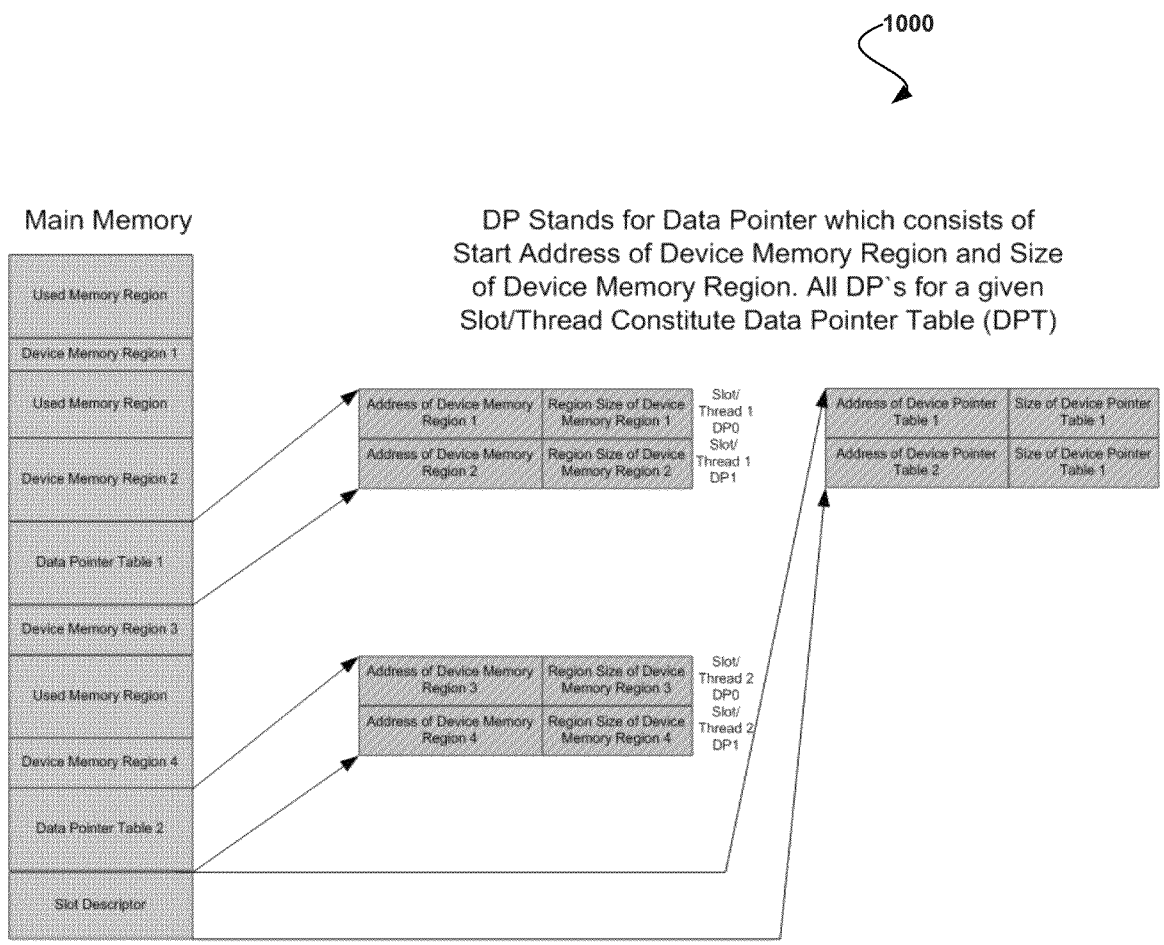
FIG. 10 s illustrates an exemplary data pointer table implementation, in accordance with another embodiment.

In today's CPU based SOC Architecture, data may be stored in memory in distributed form to be transferred to a device or to be received from a device. This may be due to page size limits and multiple applications running on a CPU at different instances of time requesting and releasing memory space, which may cause memory holes in the main memory space. The device may view this memory as a contiguous address space and may provide the offset (with this address space) and data size to be transmitted/received to/from main memory. To address this, the CPU (also called a requestor) may maintain a data pointer table (DPT) in main memory which points to this scattered data memory space in main memory where actual data is stored or retrieved, along with size of each scattered data memory. FIG. 10 illustrates an exemplary data pointer table implementation 1000, in accordance with one embodiment.

In real time, when a device sends data to the main memory or gets the data from the main memory by providing a start data offset and a data size, a lookup of a correct data pointer in the DPT needs to be performed so that the data between the device and the main memory is transferred. Devices may provide the data offset which may include the pointer of the data in main memory, where the pointer starts from zero and ends with Max_Data_Size−1 assuming all locations from offset 0 to Max_Data_Size−1 are located in contiguous location in the main memory. It may be the responsibility of the requestor to map the offset and the data size received from the device to the correct data pointer in the main memory by using a device pointer table (DPT) as a lookup.

One solution here is called a DPT pre-fetcher which is implementable in hardware and which has an output that is stored in a DPT cache, to perform the fast lookup of a DP (device pointer, which contains an address of data in main memory and data size for that address) in the DPT Cache, to get an address and data size of the main memory where data needs to be either stored or retrieved.

In one embodiment, the pre-fetcher pre-fetches an entire DPT from the main memory, and samples on the fly DPs at different index (e.g., stride) locations in the DPT. Additionally, along with that absolute data offset calculated by the pre-fetcher, the index of the sampled DP, a data buffer size, and a data address (which is part of DP) at the sampled index location may be stored in the DPT cache. In this way, whenever a requestor provides a data offset and a data size to get an address of the data buffer, the DPT cache may be searched to get the address and data size of the main memory corresponding to the data offset and the data size provided by the requestor (in case of a cache hit). If there is a cache miss, then the absolute offset and index of the nearest matching DP in the DPT cache may be provided so that the requester can start the lookup of the DP from the provided index rather than starting the lookup from index 0 in DPT. This saves time when compared to searching for the DPT from 0 and the requestor can start looking at the index provided by the DPT cache.

In another embodiment, assuming each request to/from a device takes one programming slot, which may include an independent thread of execution having a predefined space allocated in memory with one DPT allocated per slot, the pre-fetcher may be implemented as follows. The pre-fetcher may implement a DPT cache in hardware, whenever it gets indication from a requestor that a new DPT is assembled for data transfer between a main memory and a device. So the assembly of the DPT cache may start even before a request from the device is received. Once a request from the device is received, an actual lookup performed by the pre-fetcher starts in the DPT cache.

Figure 11:
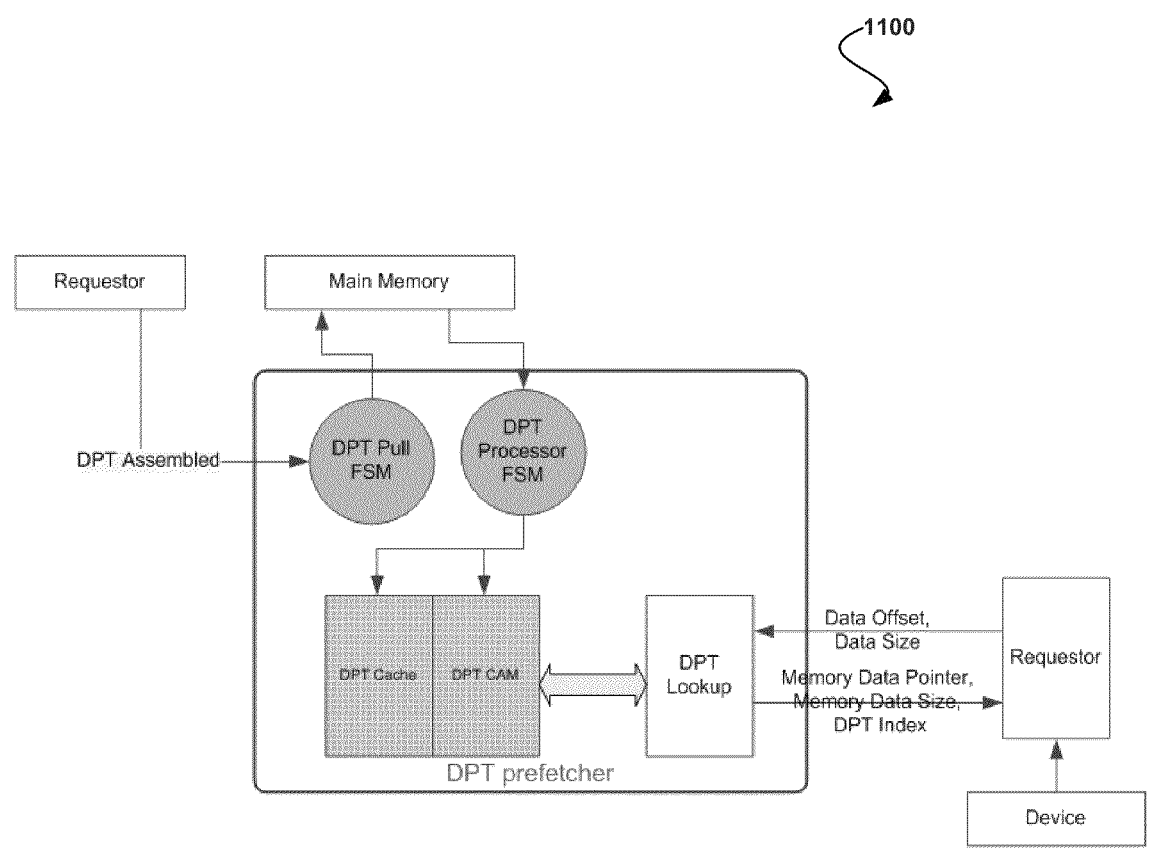
FIG. 11 illustrates an exemplary data pointer table pre-fetcher data flow, in accordance with another embodiment.

Further, the pre-fetcher may support any arbitrary offset from 0 to Max_Data_Size−1 (which may be a pointer offset in contiguous memory space as viewed by the device). The DPT cache and the pre-fetcher may speed up looking up the right DP that refers to the data offset requested. In another embodiment, N locations may be allocated per slot in the DPT cache. In yet another embodiment, N may be a power of 2 which may aid the implementation of the DPT cache in hardware with little complexity. FIG. 11 illustrates an exemplary data pointer table pre-fetcher data flow 1100, in accordance with one embodiment.

Figure 12:
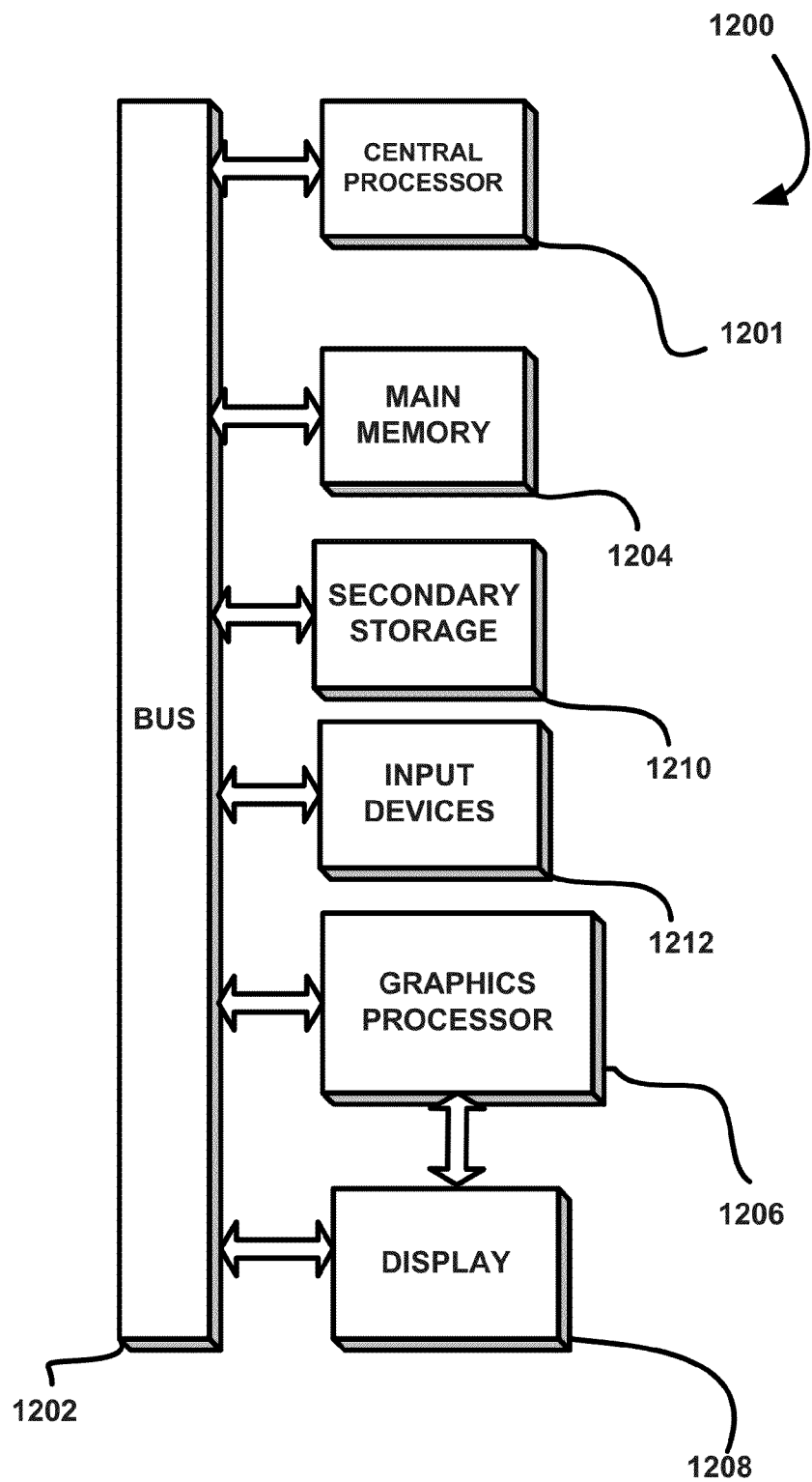
FIG. 12 illustrates an exemplary system in which the various architecture and/or functionality of the various previous embodiments may be implemented.

FIG. 12 illustrates an exemplary system 1200 in which the various architecture and/or functionality of the various previous embodiments may be implemented. As shown, a system 1200 is provided including at least one host processor 1201 which is connected to a communication bus 1202. The system 1200 also includes a main memory 1204. Control logic (software) and data are stored in the main memory 1204 which may take the form of random access memory (RAM).

The system 1200 also includes a graphics processor 1206 and a display 1208, i.e. a computer monitor. In one embodiment, the graphics processor 1206 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user. The system may also be realized by reconfigurable logic which may include (but is not restricted to) field programmable gate arrays (FPGAs).

The system 1200 may also include a secondary storage 1210. The secondary storage 1210 includes, for example, a hard disk drive and/or a removable storage drive, representing a floppy disk drive, a magnetic tape drive, a compact disk drive, a flash drive or flash based device, etc. The removable storage drive reads from and/or writes to a removable storage unit in a well known manner.

Computer programs, or computer control logic algorithms, may be stored in the main memory 1204 and/or the secondary storage 1210. Such computer programs, when executed, enable the system 1200 to perform various functions. Memory 1204, storage 1210, volatile or non-volatile storage, and/or any other type of storage are possible examples of non-transitory computer-readable media.

In one embodiment, the architecture and/or functionality of the various previous figures may be implemented in the context of the host processor 1201, graphics processor 1206, an integrated circuit (not shown) that is capable of at least a portion of the capabilities of both the host processor 1201 and the graphics processor 1206, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 1200 may take the form of a desktop computer, laptop computer, and/or any other type of logic. Still yet, the system 1200 may take the form of various other devices including, but not limited to a personal digital assistant (PDA) device, a mobile phone device, a television, etc.

Further, while not shown, the system 1200 may be coupled to a network [e.g. a telecommunications network, local area network (LAN), wireless network, wide area network (WAN) such as the Internet, peer-to-peer network, cable network, etc.] for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   identifying an assembly of a data pointer table within a main memory;
   pre-fetching the data pointer table from the main memory;
   sampling data from the pre-fetched data pointer table; and
   storing the sampled data within a data pointer table cache.

2. The method of claim 1, wherein the main memory includes a memory space in which data is stored.

3. The method of claim 1, wherein each entry within the data pointer table include an indication of a start address in the main memory and a size of an instance of data pointed to by that entry.

4. The method of claim 1, wherein the assembly of the data pointer table within the main memory is identified by a pre-fetcher.

5. The method of claim 4, wherein the pre-fetcher is implemented in hardware.

6. The method of claim 1, wherein sampling the data from the pre-fetched data pointer table includes retrieving one or more predetermined entries from the pre-fetched data pointer table.

7. The method of claim 1, wherein the data is sampled from the pre-fetched data pointer table according to a predefined starting point.

8. The method of claim 1, wherein the data is sampled from the pre-fetched data pointer table according to a predefined interval.

9. The method of claim 1, wherein a pre-fetcher creates one or more of the data pointer table cache and a data pointer table content-addressable memory.

10. The method of claim 1, wherein storing the sampled data within the data pointer table cache includes creating an entry in the data pointer table cache for each entry sampled from the data pointer table.

11. The method of claim 1, wherein storing the sampled data within the data pointer table cache includes, for each sampled entry, storing a data pointer and a data pointer index from the data pointer table for that sampled entry in a corresponding entry in the data pointer table cache.

12. The method of claim 1, further comprising, for each entry in the data pointer table cache, storing an absolute data offset and a data pointer index from the data pointer table for that sampled entry in a corresponding entry in a data pointer table content-addressable memory.

13. The method of claim 12, wherein the data pointer table cache and the data pointer table content-addressable memory are used to respond to requests from a device.

14. The method of claim 13, further comprising receiving a request from the device, where the request includes a data offset and a data size.

15. The method of claim 14, wherein one or more of the data offset and the data size are compared against data in entries of the data pointer table cache and the data pointer table content-addressable memory.

16. The method of claim 15, wherein the comparison results in one or more of a full hit, a partial hit, and a miss.

17. The method of claim 16, wherein a matching data pointer and data buffer size are returned to the device when a full hit results from the comparison.

18. The method of claim 14, wherein data is returned to the requesting device, based on results of the comparison.

19. A non-transitory computer-readable storage medium storing instructions that, when executed by a processor, cause the processor to perform steps comprising:
    identifying an assembly of a data pointer table within a main memory;
    pre-fetching the data pointer table from the main memory;
    sampling data from the pre-fetched data pointer table; and
    storing the sampled data within a data pointer table cache.

20. A system, comprising:
    a processor for identifying an assembly of a data pointer table within a main memory, pre-fetching the data pointer table from the main memory, sampling data from the pre-fetched data pointer table, and storing the sampled data within a data pointer table cache.

* * * * *